United States Patent
Caliskan et al.

(10) Patent No.: US 7,287,788 B2
(45) Date of Patent: Oct. 30, 2007

(54) SINGLE COMPONENT AUTOMOTIVE BUMPER AND LOWER FRAME RAIL

(75) Inventors: Ari Caliskan, Canton, MI (US); Dean Gericke, Brighton, MI (US)

(73) Assignees: Ford Global Technologies, LLC, Dearborn, MI (US); Vari-Form, Inc., Warren, MI (US)

( * ) Notice: Subject to any disclaimer, the term of this patent is extended or adjusted under 35 U.S.C. 154(b) by 254 days.

(21) Appl. No.: 11/147,961

(22) Filed: Jun. 8, 2005

(65) Prior Publication Data

US 2007/0152456 A1    Jul. 5, 2007

(51) Int. Cl.
B60R 19/04    (2006.01)

(52) U.S. Cl. .................. 293/102; 293/122; 293/146; 293/154

(58) Field of Classification Search ............... 293/102, 293/120, 121, 122, 146, 147, 148, 154, 155; 280/796, 797
See application file for complete search history.

(56) References Cited

U.S. PATENT DOCUMENTS

| | | | |
|---|---|---|---|
| 3,557,894 A | 1/1971 | Hanley | 180/64 |
| 3,799,283 A | 3/1974 | Freber | 180/56 |
| 4,950,010 A * | 8/1990 | Denny | 293/117 |
| 5,727,826 A | 3/1998 | Frank | 293/102 |
| 5,839,776 A | 11/1998 | Clausen | 216/188 |
| 5,882,039 A | 3/1999 | Beckman | 280/781 |
| 6,010,155 A | 1/2000 | Rinehart | 280/781 |
| 6,193,274 B1 | 2/2001 | Brown | 280/784 |
| 6,217,089 B1 * | 4/2001 | Goto et al. | 293/102 |
| 6,510,771 B2 | 1/2003 | Sturrus | 83/54 |
| 6,926,327 B2 * | 8/2005 | Shibata | 293/155 |
| 2003/0116981 A1 * | 6/2003 | McCoy et al. | 293/102 |

* cited by examiner

*Primary Examiner*—Joseph D. Pape
(74) *Attorney, Agent, or Firm*—Gigette Bejin; Miller Law Group, PLLC

(57) ABSTRACT

A single component bumper beam and lower frame midrail structure, is formed through a hydroforming process to create a uniform "B-shaped" cross-sectional configuration with internal crash triggers to enhance crash performance. The mounting legs of the integral bumper structure are formed with a reduced cross-section at the terminal ends thereof to facilitate insertion into lower frame midrails formed from a pair of horizontally disposed tubes. The terminal end portions of the mounting legs are formed with a longitudinally extending slot to receive a central co-joined wall member formed through the welding of the two vertically oriented tubular members in the lower frame midrails. The single component bumper and longitudinally extending mounting leg structure can be formed by welding together two vertically oriented tubes.

15 Claims, 4 Drawing Sheets

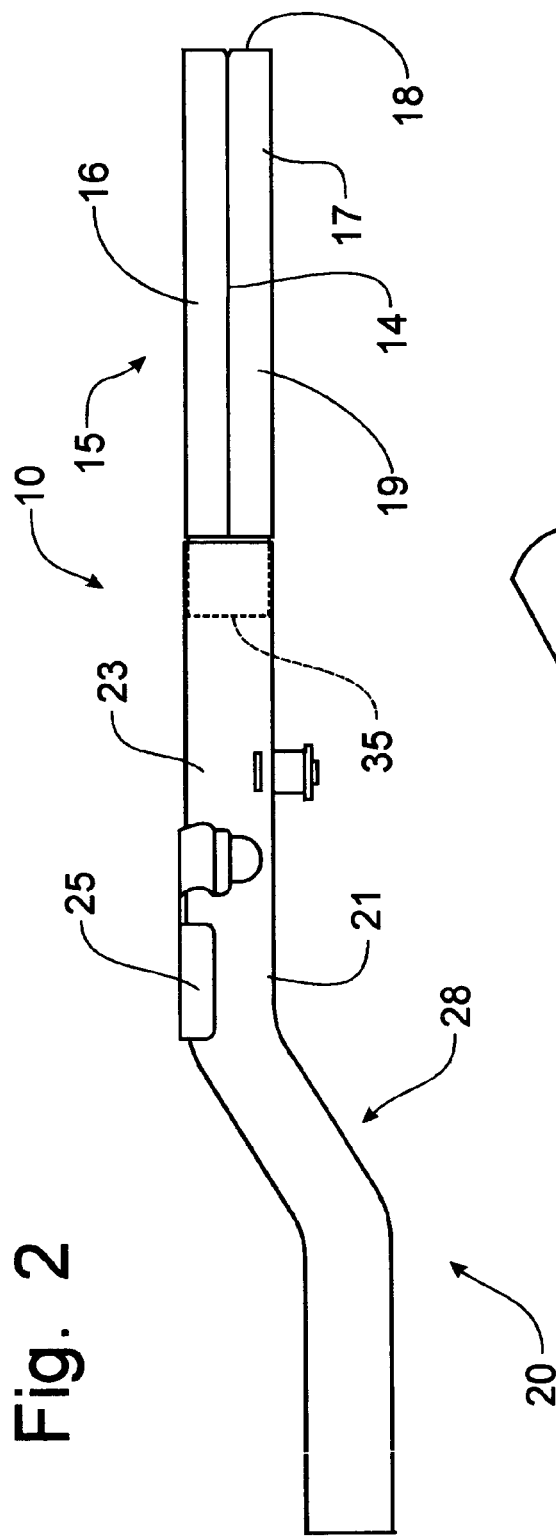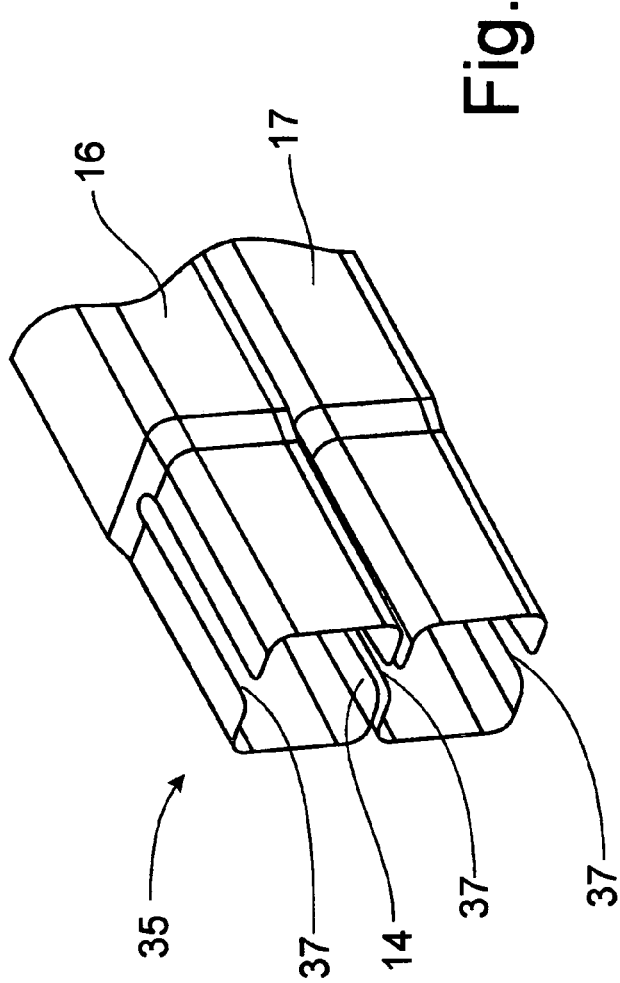

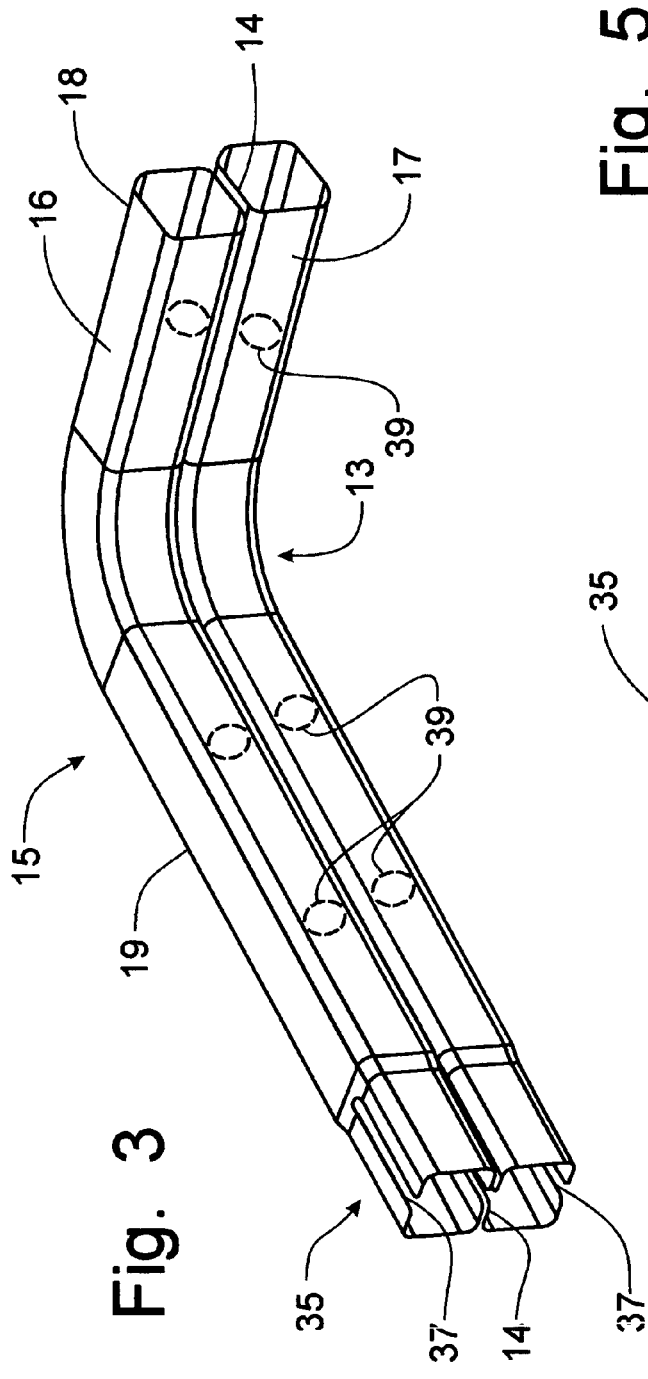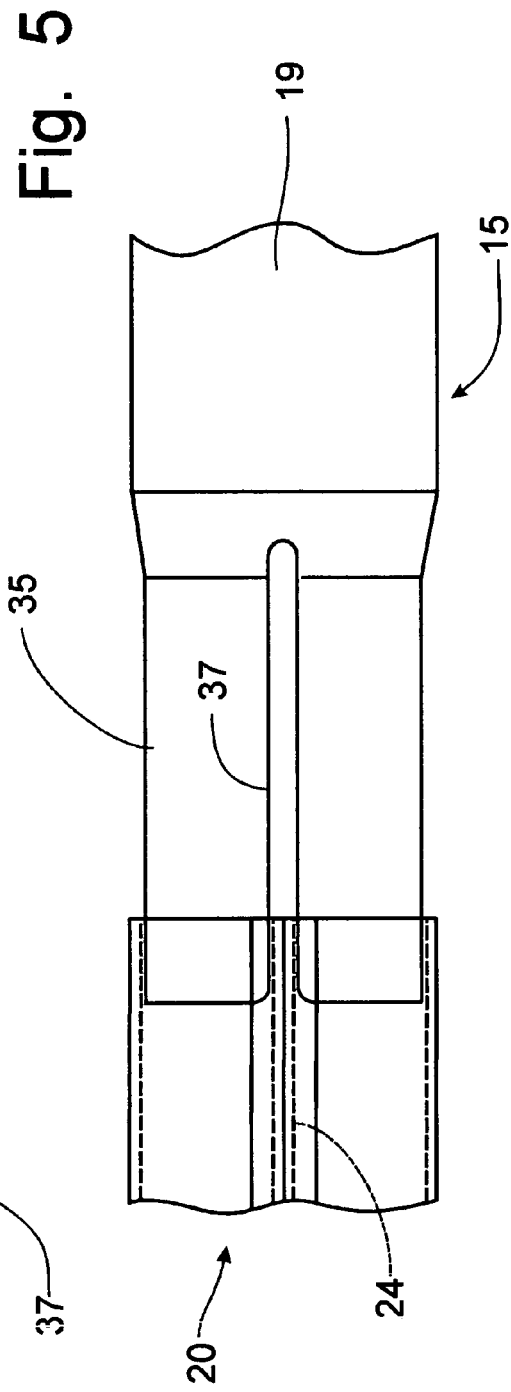

SINGLE COMPONENT AUTOMOTIVE BUMPER AND LOWER FRAME RAIL

FIELD OF THE INVENTION

This invention relates to a bumper for an automotive vehicle and, more particularly, to a rear bumper and lower frame rail formed from a single hydroformed component for attachment to the lower frame midrails.

BACKGROUND OF THE INVENTION

Bumpers are mounted at the forward and rearward extremities of a vehicle to protect the chassis of the vehicle from minor impacts. The bumper is mounted to the lower frame rails of the vehicle chassis for support thereof and functions to withstand minor impacts by collapsing to absorb the energy encountered through the impact.

The structure of a bumper can be formed in a "B-shaped" configuration with a front face flange and upper and lower cells. This B-shaped structural configuration can be seen in U.S. Pat. No. 6,510,771, issued to Peter Sturrus, et al on Jan. 28, 2003. The Sturrus patent discloses a bumper having a transversely extending member shaped in the "B" configuration with the bumper having upper and lower tubular portions with an intermediate portion between the two tubular cells. Bumpers can be formed through a number of processes, including roll-forming; stamping, such as is depicted in U.S. Pat. No. 6,193,274, issued to Richard Brown, et al on Feb. 27, 2001, in which the bumper support and front rail portion is formed by a central tubing and side tubular members; and extruding, such as is depicted in U.S. Pat. No. 5,727,826, issued to Simon Frank, et al on Mar. 17, 1998, wherein the bumper is formed by two longitudinally spaced wall sections or by integrally forming longitudinal and vertically spaced struts.

The frame apparatus disclosed in U.S. Pat. No. 5,882,039, issued to John Beckman, et al on Mar. 16, 1999, is formed through hydroforming and incorporates a cross member extending across the U-shaped frame member to form an engine cradle. U.S. Pat. No. 6,010,155, issued to Ronald Rinehart on Jan. 4, 2000, discloses the connection of longitudinally spaced tubing members via the insertion of one rounded portion of a member into the slotted and split rounded portion of the other tubing member. U.S. Pat. No. 5,839,776, issued to Edvin Clausen on Nov. 24, 1998, discloses vertically spaced tubes between frame rails and the bumper.

U.S. Pat. No. 3,557,894, issued to Donald Hanley on Jan. 26, 1971, and U.S. Pat. No. 3,779,283, issued to Elmer Freber on Mar. 26, 1974, teach the forming a go-cart framing through tubes that form a bumper and a substantial portion of the go-cart's frame structure. Such bumper and frame structure is not particularly well suited to modem automotive manufacture.

It would be desirable to provide a bumper and lower frame rail structure that are particularly adaptable to manufacturing through hydroforming processes and which can be utilized in the manufacture of an automobile while providing adequate crash performance characteristics.

SUMMARY OF THE INVENTION

It is an object of this invention to overcome the aforementioned disadvantages of the known prior art by providing a single component bumper and lower frame rail construction that can be attached to and supported from the lower frame midrails.

It is a feature of this invention that the bumper structure can be formed through hydroforming processes to enhance manufacturing efficiencies.

It is an advantage of this invention that the cross-sectional configuration of the bumper beam can be uniformly manufactured along the entire length of the bumper beam and extending through the lower frame rails.

It is still another advantage of this invention that the bumper and lower frame rails are formed into a single structural component having a generally uniform cross-sectional configuration throughout.

It is still another feature of this invention that the bumper beam can be formed with crash triggers to direct the deformation of the bumper and lower frame rail in a manner to enhance crash performance.

It is a further advantage of this invention that the manufacturing cost of a bumper and lower frame rail can be lowered without sacrificing crash performance characteristics.

It is another object of this invention to provide a single component bumper beam and lower frame rail structure that is durable in construction, inexpensive of manufacture, facile in assemblage, and simple and effective in use.

These and other objects, features and advantages are accomplished according to the instant invention by providing a single component bumper beam and lower frame rail structure, which can be formed through a hydroforming process to create a uniform "B-shaped" cross-sectional configuration with internal crash triggers to enhance crash performance. The mounting legs of the integral bumper structure are formed with a reduced cross-section at the terminal ends thereof to facilitate insertion into lower frame rails formed from a pair of horizontally disposed tubes. The terminal end portions of the mounting legs are formed with a longitudinally extending slot to receive a central co-joined wall member formed through the welding of the two vertically oriented tubular members in the lower frame rails. The single component bumper and longitudinally extending mounting leg structure can be formed by welding together two vertically oriented tubes.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is a side elevational view of the bumper and lower frame rail structure depicted in FIG. 1;

FIG. 3 is an enlarged partial perspective view of the bumper structure incorporating the principles of the instant invention;

FIG. 4 is an enlarged perspective detail view of the reduced terminal end portion of the longitudinally extending mounting legs of the bumper structure to be inserted into the lower frame rails, as is depicted in FIGS. 1 and 2;

FIG. 5 is a top plan view of the reduced terminal end portion of the mounting leg structure being inserted into the dual tube lower frame midrails as depicted in FIGS. 1 and 2;

DETAILED DESCRIPTION OF THE PREFERRED EMBODIMENT

Figure 1:
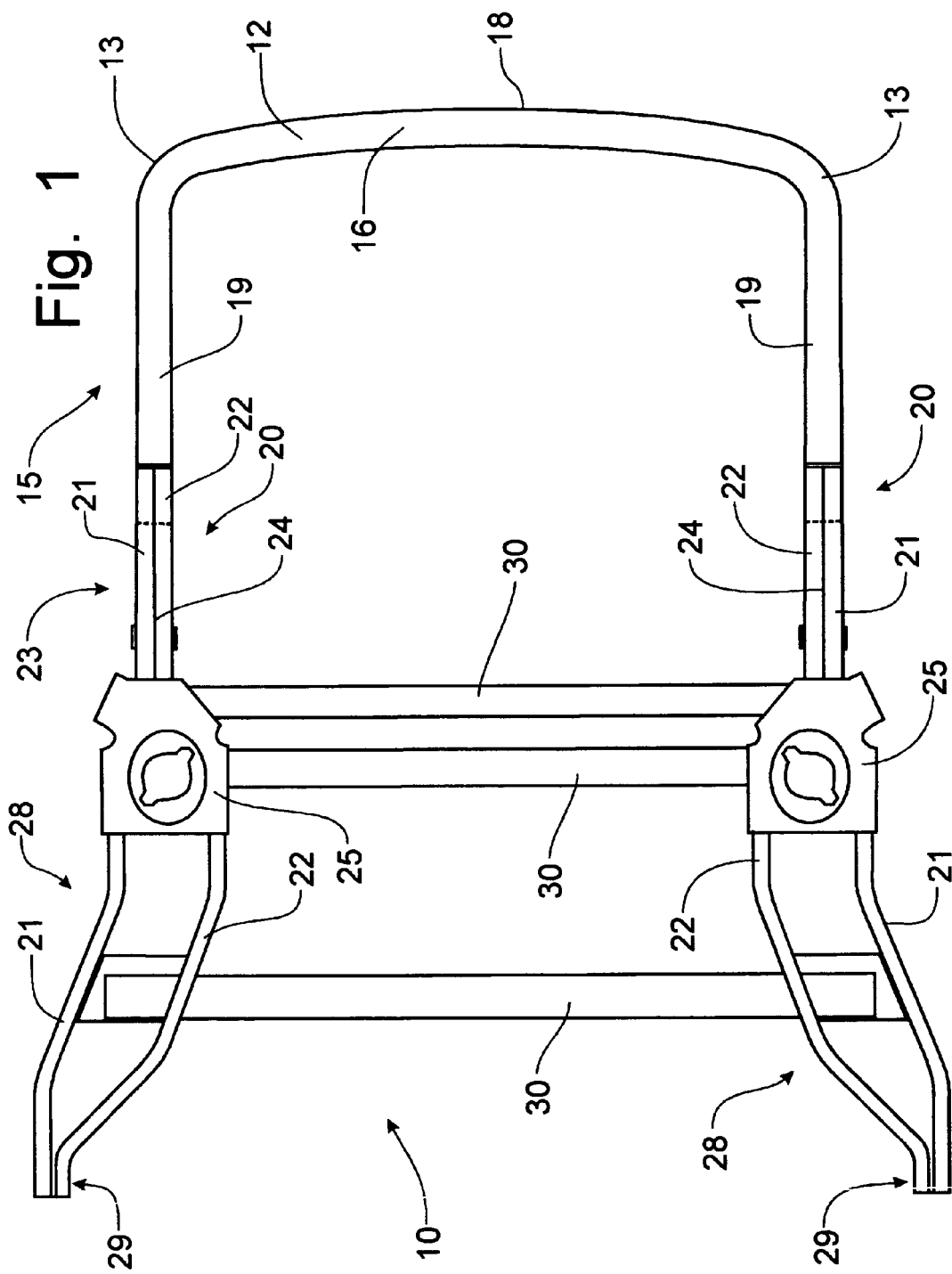
FIG. 1 is a top plan view of the single component bumper and lower frame rail structure attached to the frame midrails to form the rear frame structure for an automobile incorporating the principles of the instant invention.

Referring to FIGS. 1 and 2, a bumper and lower frame rail, including the midrails having a shock tower support mounted thereon, forming the rear end of an automobile frame and incorporating the principles of the instant invention, can best be seen. The frame 10 of the automobile is preferably formed from hydroformed tubular members. Such tubular members can be spot-welded and/or MIG-welded to form an integral frame assembly for the rear end of a vehicle.

Hydroforming is a process by which a standard tubular stock member is placed into a form shaped to correspond to the particular member to be formed and to correspond to the particular section required for the frame design. A liquid is then introduced into the interior of the tubular stock and pressurized until the tubular stock expands to assume the shape defined by the configured form The expanded and re-shaped tubular stock now has a substantially different shape. By forming cutouts and other access openings into the re-shaped tubular member, spot-welding electrodes can gain access to opposing adjacent sides to create a weld bond between juxtaposed members. In this manner, a frame, as an example, for an automobile can be created using in large part hydroformed tubular members. One skilled in the art will readily recognize that some MIG-welding will be required in areas where access holes are detrimental to the integrity of the frame structure. Preferably, such MIG-welding processes are performed at a sub-assembly or at a supplier level.

In the automotive rear end frame 10 depicted in the drawings, the bumper 15 is formed from welded hydroformed members. Similarly, the lower frame midrails 20, which connect to the bumper 15 and project forwardly therefrom, are also formed from tubular hydroformed members. The shock tower support member 25 is preferably a stamping that is formed into a specific shape and mounted on the lower frame midrails 20, as is described in greater detail below.

The lower frame midrail 20 is formed from two hydroformed tubular members 21, 22 that have corresponding first longitudinally extending portions 23 that are welded together at the rearwardmost end of the members 21, 22 preferably by MIG-welding along the generally horizontal seam between the members 21, 22. As is best seen in FIGS. 1 and 5, the lower frame midrail structure 20 would then have an internal vertical web 24 formed from the adjacent sidewalls of the two tubular members 21, 22, oriented as an exterior member 21 and an interior member 22. The internal web 24 substantially increases the strength and stiffness of the lower frame midrail 20, compared to a conventional tubular member.

The longitudinally extending portions 23 are positioned for connection to the bumper 15, as will be described in greater detail below. Forwardly of the longitudinally extending portions 23, the two tubular members 21, 22 diverge to define a divergent portion 28 to provide a lateral spacing between the two members 21, 22. At this point of divergence, the shock tower support 25 is affixed, preferably by welding, to the top of the two tubular members 21, 22. The tubular members 21, 22 converge into a second longitudinally extending portion 29 forward of said divergent portion 28.

Unlike conventional shock tower supports, the shock tower support member 25 is adequately supported both inboard and outboard on the laterally spaced members 21, 22 in the divergent zone 28 to provide a stable foundation for the shock tower (not shown). The shock tower support stamping 25 transfers road loads directly to the frame 10 and also provides sectional stability for any rear impact loads that might be encountered. This design results in a stiffer, stronger, yet lighter joint than is known in the prior art.

To facilitate the use of spot welding techniques, the tubular members 21, 22 can be formed with appropriate access openings (not shown) in the sidewalls for passage of a welding electrode. Similarly, cross frame members 30 can be welded between the opposing sides of the lower frame rails 20 to span the lateral distance across the vehicle frame 10. The cross frame members 30 can be inserted into appropriate openings 27 in the sidewalls of the tubular members 21, 22 to permit the passage of the cross frame members 30 internally into the interior tubular member 22 to enable the cross frame members 30 to be welded directly to the interior tubular member 22.

Figure 6:
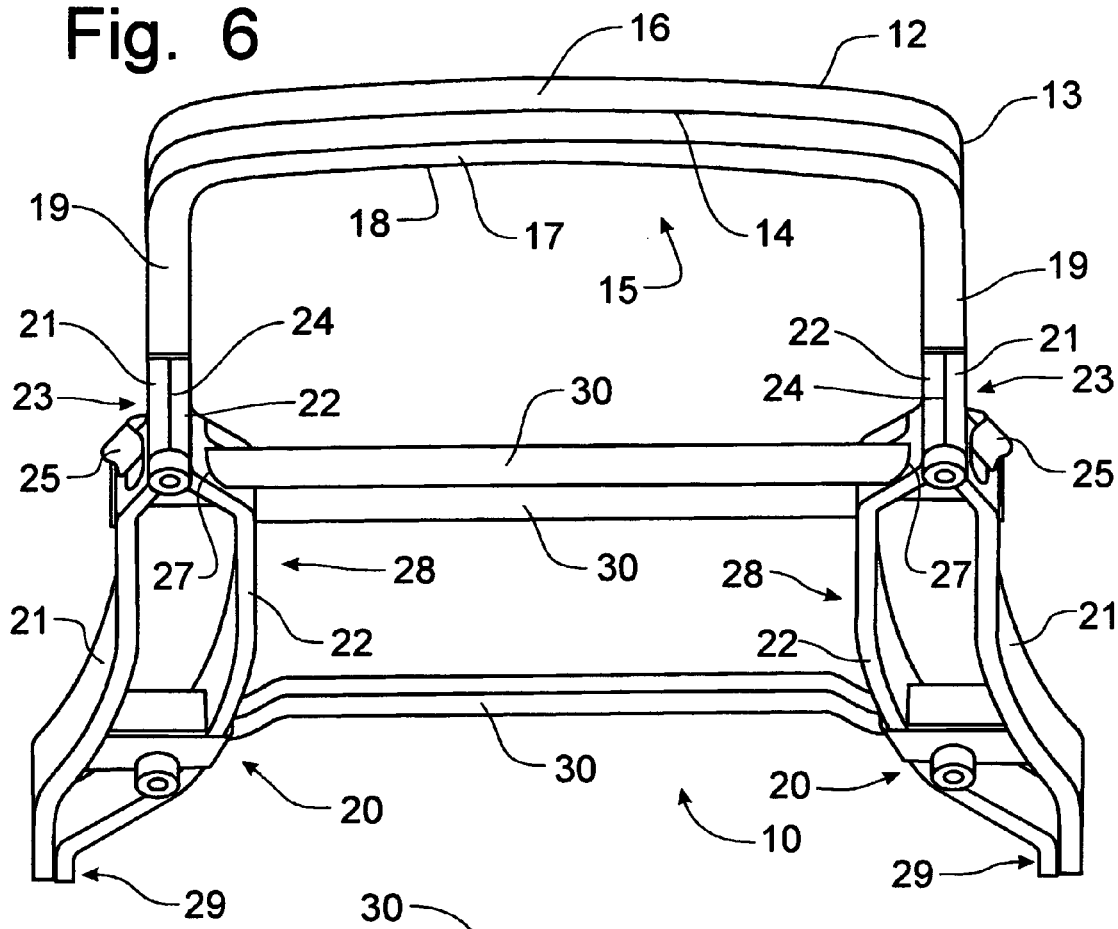
FIG. 6 is a bottom perspective view of the bumper and lower frame rail structure shown in FIG. 1.
Figure 7:
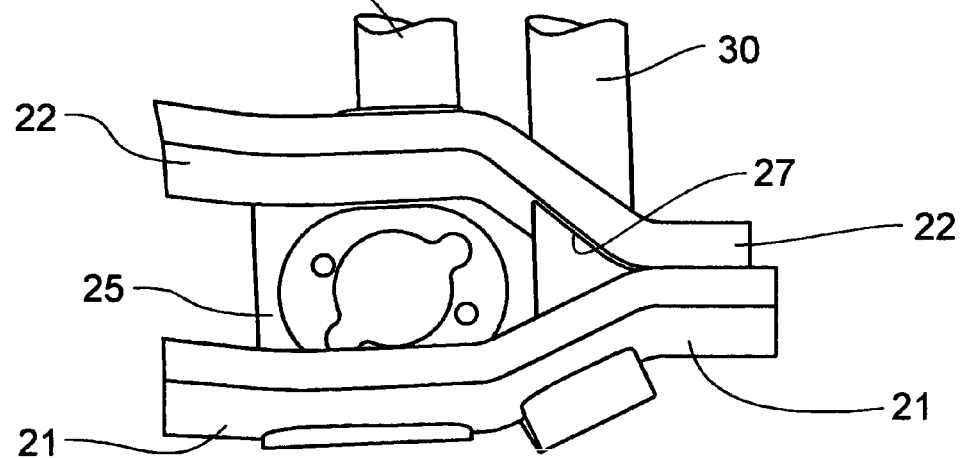
FIG. 7 is an enlarged bottom perspective view of the divergent zone of the lower frame midrail assembly showing the connection of the cross frame members and the shock tower support member.

Preferably, as is best seen in FIG. 6, at least one of the cross frame members 30 adjacent the shock tower support 25 will pass through appropriate openings 27 in the interior tubular member 22 to engage the exterior tubular member 21 to permit welding between both members 21, 22 and the cross frame member 30. Such fabrication will add cross-vehicle stiffness to the frame 10, as well as provide a robust joint at the shock tower support 25. Preferably, the interior and exterior tubular members 21, 22 converge so that the lower frame midrail 20 will extend forwardly with a central vertical web 24, as is shown with respect to the rearward longitudinally extending portions 23.

The bumper 15 can also be constructed from two hydroformed members 16, 17, with the upper tubular member 16 being located on top of the lower tubular member 17. Preferably both tubular bumper members 16, 17 are shaped substantially identically with a rearwardly positioned transverse portion 18 and opposing mounting legs 19, which eliminate the need for a separate lower frame rail spanning between a conventional lower frame midrail and the bumper. The two tubular members 16, 17 can be MIG-welded along the generally horizontally extending seam therebetween to form a dual-celled bumper 15. Formation of the tubular members through the hydroforming process permits the introduction of deformation triggers 39, i.e. fold points to direct the deformation of the bumper in a prescribed manner when encountering an impact load.

This bumper 15 not only has the transverse portion 18 forming the laterally extending rear bumper beam 12, but the integrally formed longitudinally extending mounting legs 19, or lower frame rails, provide the function of mounting the bumper beam 12 to the lower frame midrails 20. A curved transition portion 13 preferably separates the transverse portion 18 from the longitudinal mounting legs 19. In conventional bumper design, the bumper beam, lower frame rails, and attachment brackets are separate parts that are assembled to form the bumper structure. The formation of the bumper 15 according to the principles of the instant invention substantially reduces the number of parts required. With the two tubular members 16, 17 being welded together in a vertical orientation, the resultant structure has a horizontally oriented internal web 14 that enhances strength and stiffness for the bumper structure 15.

One of ordinary skill in the art will readily realize that the bumper 15 could also be formed through a roll-forming process in which the upper and lower cells of the bumper beam 15 would be separated by a horizontally oriented internal web 14. While the formation of the tubular members 16, 17 through the hydroforming process enables the tubular members 16, 17 to have triggers 39 formed therein during the formation process, the crash triggers 39 would have to be formed in the bumper by a separate processing step if the bumper 15 were manufactured through the roll-forming process.

Referring particularly to FIGS. 3-5, the forward ends of the mounting legs 19 are formed to mate with the dual tube lower frame midrails 20. Each tubular member 16, 17 is formed with a reduced-sized terminal end 35 that can fit between the interior and exterior sidewalls of the lower frame midrails 20, whereas the remainder of the mounting legs 19 are formed to correspond geometrically with the longitudinally extending portions 23 of the lower frame rails 20. As a result, the insertion of the reduced-sized terminal end 35 into the rearward ends of the lower frame midrails 20 results in a generally uniformly shaped frame 10 with the overall width and depth of the bumper structure 15 being substantially equal to the overall width and depth of the lower frame midrails 20.

To accommodate the interference between the horizontal internal web 14 of the mounting legs 19 and the vertical internal web 24 of the longitudinally extending portions 23 of the lower frame midrails 20, the reduced-size terminal end 35 is formed with a slot 37 into the top and bottom walls of both of the upper and lower tubular members 16, 17. When the reduced-size ends 35 of the mounting legs 19 are inserted into the lower frame midrails 20, the vertical internal web 24 slides into the aligned slots 37.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A bumper assembly for an automotive vehicle, comprising:
   a pair of tubular members affixed to one another in a vertical orientation to place a sidewall of each said tubular member adjacent one another and define a generally horizontally oriented internal web member formed from said adjacent sidewalls, said tubular members being welded along a seam between said tubular members, each said tubular member being formed with a transverse portion and a pair of longitudinally extending mounting legs, each said mounting leg being formed with a reduced-size terminal end to permit insertion into a lower frame midrail having substantially identical external dimensions as said mounting legs, said lower frame midrail being formed with a generally vertical internal web, said reduced-size terminal end of said mounting legs having a slot formed therein to permit the receipt of said vertical internal web when said reduced-size terminal end is inserted into said lower frame midrail.

2. The bumper assembly of claim 1 wherein each said tubular member is formed with a pair of vertically spaced horizontally oriented walls and a pair of spaced interconnecting vertically oriented walls, each said horizontally oriented wall of said reduced-size terminal end being formed with said slot.

3. The bumper assembly of claim 2 wherein said tubular members are formed through a hydroforming process with crash triggers formed in said tubular members.

4. A bumper for an automobile, said bumper being connected to a lower frame of said automobile for support thereof, comprising:
   a transverse beam portion formed as a pair of tubular members oriented vertically to define a generally horizontally oriented internal web member formed from the two adjacent sidewalls of said tubular members; and
   a pair of longitudinally extending mounting legs integrally formed with said transverse beam portion and having a substantially identical geometrical configuration as said transverse beam portion including said generally horizontally oriented internal web member formed from the two adjacent sidewalls of said tubular members.

5. The bumper of claim 4 further comprising a curved transition portion between said transverse beam portion and said mounting legs, said curved transition portion having a substantially identical geometrical configuration as said transverse beam portion and said mounting legs.

6. The bumper of claim 5 wherein each said mounting leg has a reduced-sized terminal end configured to be inserted into said lower frame of said automobile.

7. The bumper of claim 6 wherein said lower frame is formed as a tubular member having a generally vertical internal web, said terminal ends of said mounting legs being formed with a slot to permit passage of said generally vertical internal web.

8. The bumper of claim 7 wherein said integral transverse beam portion, said transition portions and said mounting legs are formed from a pair of tubular members affixed to one another in a vertical orientation to define a generally horizontally oriented internal web member formed from adjacent sidewalls of said tubular members, said tubular members being welded along a seam corresponding to said horizontally oriented internal web between said tubular members.

9. The bumper of claim 8 wherein said tubular members are formed through a hydroforming process with crash triggers formed in said tubular members.

10. In an automotive frame having a bumper beam supported from lower frame midrails, the improvement comprising:
    said bumper beam being formed with upper and lower cells having a generally horizontal internal web dividing said bumper beam into said upper and lower cells, said bumper beam including a transverse portion and integral, longitudinally extending mounting legs, each said mounting leg having a terminal end formed with a slot therein; and
    said lower frame midrails being formed in a tubular configuration such that each said terminal end is received internally of the corresponding said lower frame midrail to mount said bumper beam to said lower frame midrails, said lower frame midrails being formed with a generally vertical internal web that is received within said slot in said terminal end when said bumper beam is mounted on said lower frame midrails.

11. The automotive frame of claim 10 wherein said slot is formed in a top wall of said upper cell, in a bottom wall of said lower cell, and in said generally horizontal internal web of said bumper beam.

12. The automotive frame of claim 11 wherein said bumper beam has a substantially identical exterior geometry as said lower frame midrails, each said terminal end being formed in a reduced-size configuration to permit the insertion of said terminal ends into said lower frame midrails.

13. The automotive frame of claim 12 wherein said bumper beam is formed from a pair of tubular members affixed to one another in a vertical orientation to define said generally horizontally oriented internal web member corresponding to adjacent sidewalls of said tubular members.

14. The automotive frame of claim 13 wherein said tubular members are welded along a seam corresponding to said horizontally oriented internal web between said tubular members.

15. The automotive frame of claim 14 wherein said tubular members are formed through a hydroforming process with crash triggers formed in said tubular members.

* * * * *